MOBILE WAREHOUSE SYSTEM

Original Filed May 6, 1963 4 Sheets-Sheet 1

INVENTOR.
SOLOMON KATZ
BY
Millman and Jacobs
ATTORNEYS.

MOBILE WAREHOUSE SYSTEM

Original Filed May 6, 1963 4 Sheets-Sheet 2

INVENTOR.
SOLOMON KATZ
BY
Millman and Jacobs
ATTORNEYS.

MOBILE WAREHOUSE SYSTEM

Original Filed May 6, 1963

4 Sheets-Sheet 3

INVENTOR.
SOLOMON KATZ

BY Millman and Jacobs
ATTORNEYS.

MOBILE WAREHOUSE SYSTEM

Original Filed May 6, 1963 4 Sheets-Sheet 4

INVENTOR.
SOLOMON KATZ
BY
Millman and Jacobs
ATTORNEYS.

3,288,314
MOBILE WAREHOUSE SYSTEM
Solomon Katz, Fairless Hills, Pa., assignor to Strick Corporation, a corporation of Pennsylvania
Original application May 6, 1963, Ser. No. 278,005, now Patent No. 3,211,313, dated Oct. 12, 1965. Divided and this application Dec. 7, 1964, Ser. No. 448,222
9 Claims. (Cl. 214—152)

This is a division of application Ser. No. 278,005, filed May 6, 1963, now Patent No. 3,211,313.

This invention relates to a mobile warehouse system and trailer body especially adapted for use in the system.

Heretofore, it was the practice in manufacturing establishments to station an operator at the discharge end of a machine at a production site who removed the manufactured or packed units, placed them in containers and stacked the container on carts. The carts when fully loaded were generally coupled together and drawn by tugs into an enclosure serving as a warehouse where the containers were removed by a lift truck from the carts and transported and stacked in aisles or bins. The empty carts were then returned to the production sites at the machines for re-use. When ready for delivery, the containers in the warehouse were then packed into the trailer body again with the aid of a lift truck.

It is the primary object of the invention to provide a system which, by utilizing a special trailer body as the warehousing and transporting unit, effects marked economies in the aforementioned practice by eliminating the need for carts, tugs to pull the carts, and lift trucks, thereby saving the initial cost as well as the maintenance and depreciation of this equipment, as well as the expense and labor of packing and unpacking the carts at the machine, then transferring the articles to a warehouse and finally transferring the articles from the warehouse to the trailer body.

Another object of the invention is to provide a mobile warehouse system which, by utilizing a special trailer body for loading at the point of production as well as the warehouse and delivery unit per se, imparts flexibility and adaptability to the problem of storage since no specific warehouse enclosure is required, the number of warehouse units can be increased and decreased as needed and warehouse space can be readily transferred from one plant to another.

Another object of the invention is to provide a mobile warehouse unit of the character described which minimizes the pilferage and breakage losses normally encountered in conventional storage and warehouse operations where a single breaking and entry will yield access to the stacked articles in the warehouse in contradistinction to the fact that, in the present system, breaking and entry into each securely locked trailer body is required for access to all the stored articles.

Another object of the invention is to provide a mobile warehouse system of the character described which is versatile in that it can efficiently satisfy the needs for rush shipments on the one hand and delayed shipments on the other, as, for example, in the food industry where packing must be done seasonally although shipment is to be effected months later.

Another object of the invention is to provide a trailer body for use in a mobile warehouse system which includes a demountable bogie and easily operable means to raise a portion of the body without the need for heavy duty jacks to permit ready removal of the bogie, said raising means also including supports for the body in its storage or warehouse position.

Another object of the invention is to provide a trailer body for use in a mobile warehouse which is readily adapted for transfer as containerized cargo onto the over-the-road running gear, on a rail car or on board ship.

These and other objects of the invention will become more apparent as the following description proceeds in conjunction with the accompanying drawings, wherein.

Specific reference is now made to the drawings wherein similar reference characters are used for corresponding elements throughout.

Figure 11:
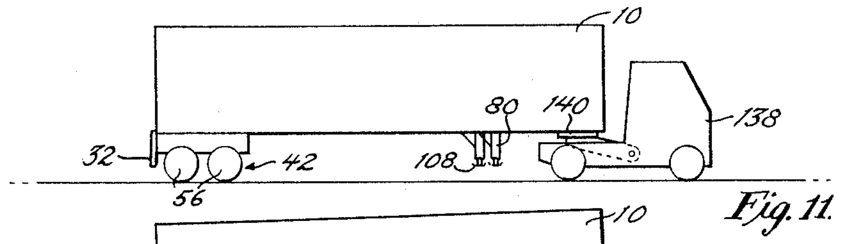
FIGS. 11–16 are diagrammatic views illustrating the sequence of steps in going from the transportation to the storage or warehouse position of the trailer body.
Figure 12:
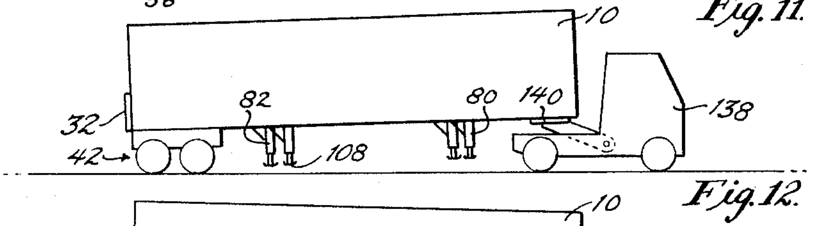
Figure 13:
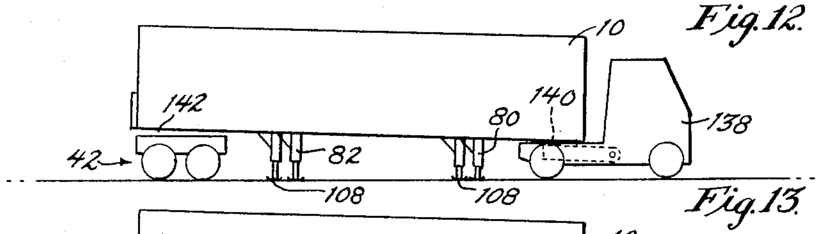
Figure 14:
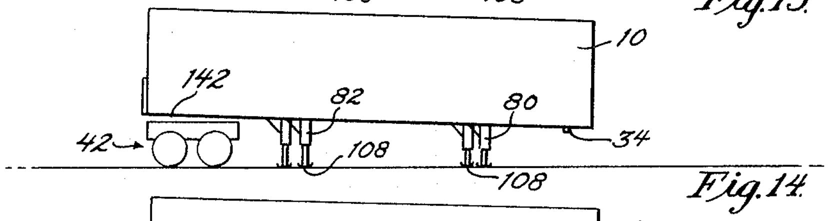
Figure 15:
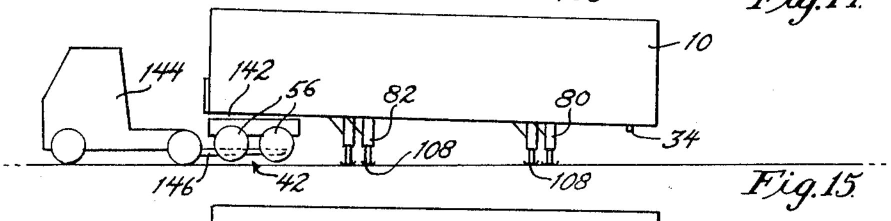
Figure 16:
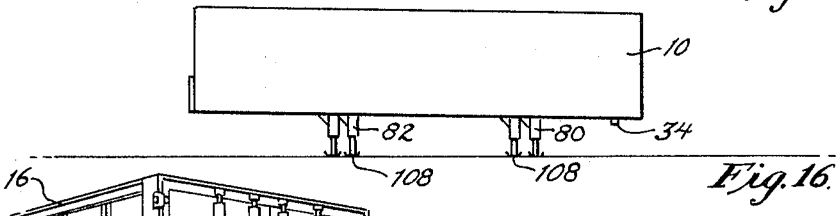
Figure 10:
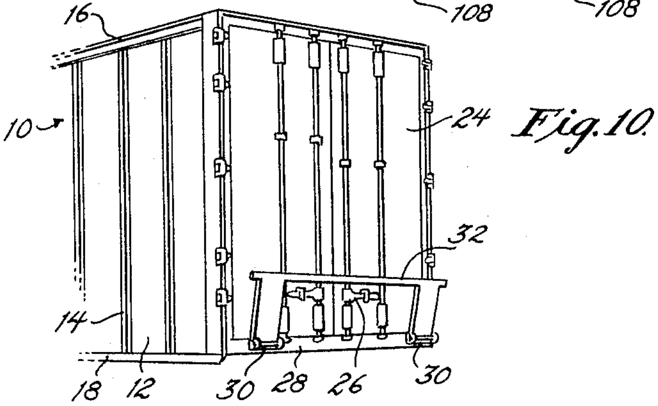
FIG. 10 is a perspective view of the rear of the trailer body.

Referring first to FIGS. 1–10, the trailer body 10 itself may be conventional and comprises side members including panels 12 connected to inner or outer vertical posts 14 between top and bottom rails 16 and 18. Longitudinally spaced cross sills 20 extend between the bottom rails and support a suitable floor 22. A roof extends between and is engaged by the top rails. The rear of the body is provided with the usual doors 24 and means 26 to securely lock the same while to the sill 28 beneath the doors is hinged as at 30 a stepguard 32 which is movable from the down position shown in FIG. 11 to the up position shown in FIG. 10. A king pin 34 is provided at the bottom of the body towards its front end.

Figures 7, 8, 9:
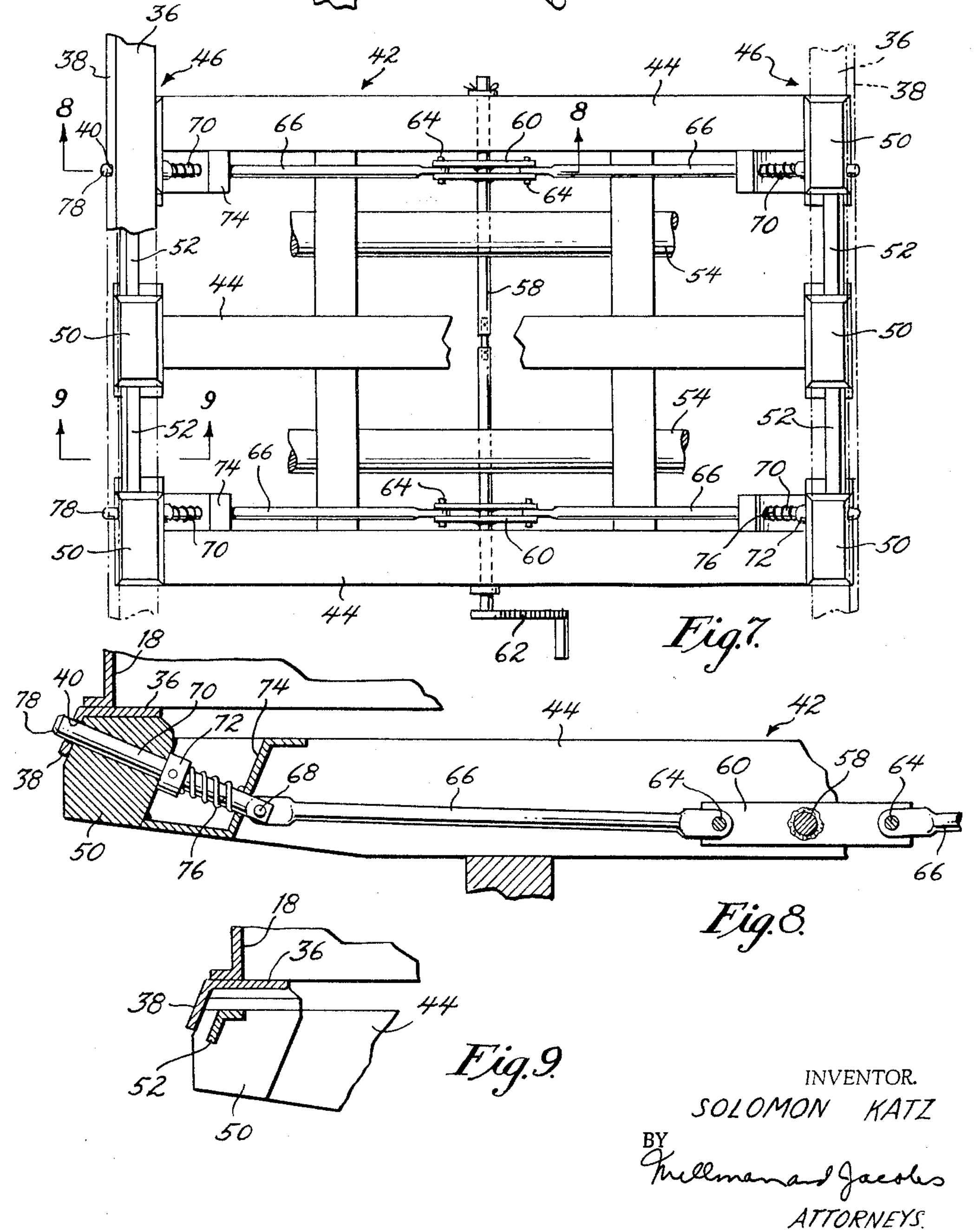
FIG. 7 is a sectional view taken on the line 7—7 of FIG. 6.
FIG. 8 is an enlarged sectional view taken on the line 8—8 of FIG. 7.
FIG. 9 is an enlarged sectional view taken on the line 9—9 of FIG. 7.

Each side rail has secured to the bottom thereof a track member preferably in the form of an angle having a horizontally disposed flange 36 and a vertically extending flange 38, see FIGS. 8 and 9, the flange 38 including longitudinally spaced apertures 40 adjacent the rear of the trailer. A wheeled unit or bogie 42 is provided consisting of a frame including cross beams 44 interconnecting side members 46 each including spaced support castings or blocks 50 which are in turn connected by recessed angle members 52. The bogie frame mounts conventional leaf springs from which are suspended transverse axles 54 bearing the road wheels 56.

The body 10 is slidable on the bogie 42 and is removably or demountably coupled thereto by a suitable means such as that shown and described in the Sheppard et al. Patent No. 2,841,411. If desired, a series of spaced apertures 40 may be provided in the flanges 38 of the track members if adjustable coupling of the bogie to the body is desired to shift the load on the axles when required.

The coupling means includes a shaft 58 rotably mounted centrally and longitudinally on the bogie frame and including pairs of spaced plates 60 fixed to the shaft and an operating handle 62 at the rear thereof. Pivoted at their inner ends as at 64 between each pair of plates are transversely extending rods 66, the outer ends of which are each pivoted as at 68, see FIG. 8, to a coupling pin 70. This includes a portion which extends slidably at an upward angle through a bore in the castings 50, there being a collar 72 on the pin outside the casting and a bracket 74 beyond the pivot 68 between which a spring 76 is provided to normally urge the coupling pin outwardly towards the track angle. When the handle is rotated in a counter-clockwise direction, the rods 66 and pins 70 are moved outwardly until the outer ends 78 of the pins extend through the apertures 40 of the flanges 38 of the track angles to effect a coupling of the bogie to the body. Reverse rotation of the handle will retract the coupling pins until they are no longer engaged in the apertures 40 of the track angles at which time the bogie is uncoupled and relative movement between it and the body may be effected.

Figures 2, 3, 4, 5:
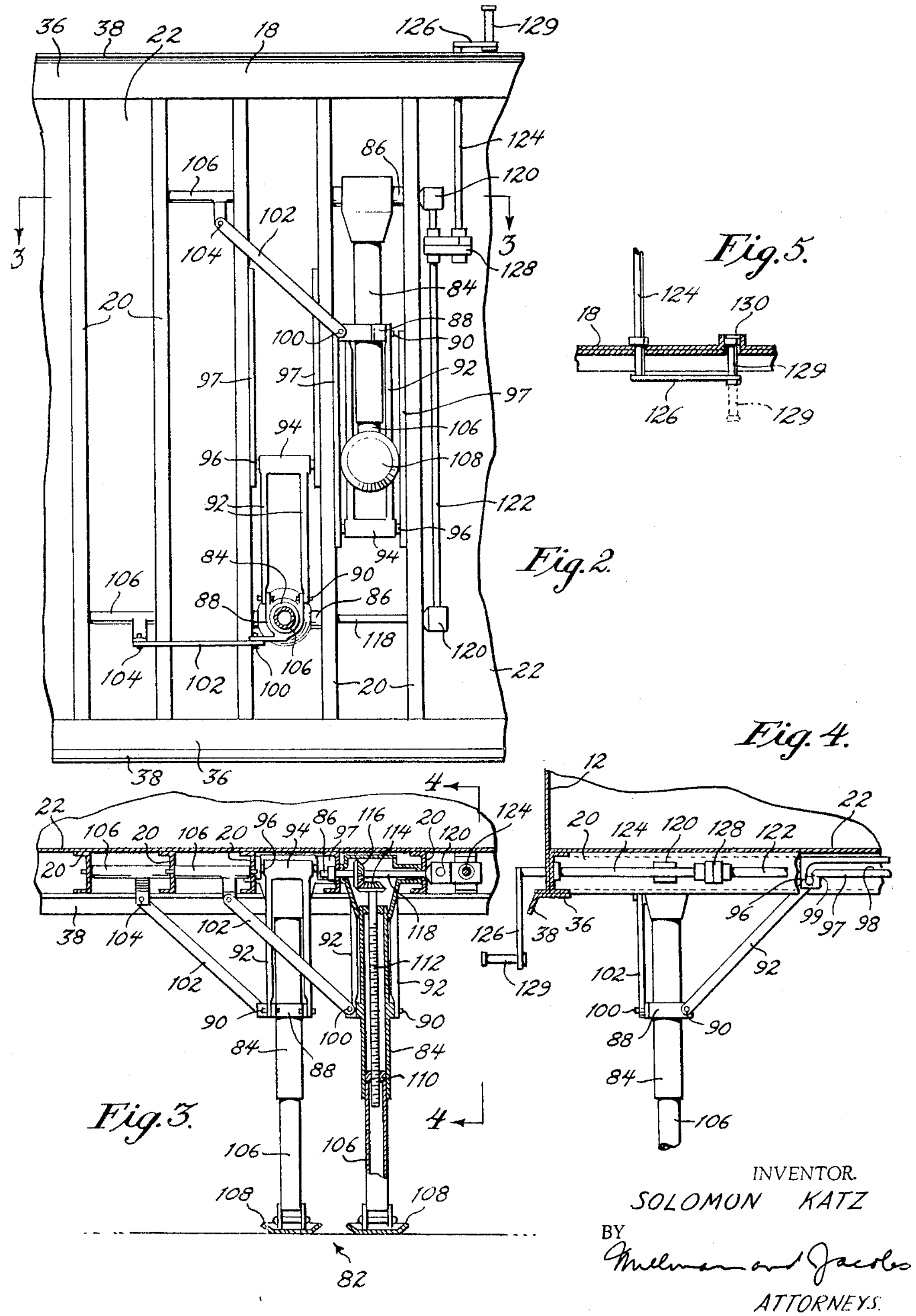
FIG. 2 is an enlarged sectional view taken on the line 2—2 of FIG. 1 with one landing gear shown down and the other in the stored position.
FIG. 3 is a sectional view taken on the line 3—3 of FIG. 2.
FIG. 4 is a sectional view taken on the line 4—4 of FIG. 3.
FIG. 5 is a sectional view taken on the line 5—5 of FIG. 1.
Figure 6:
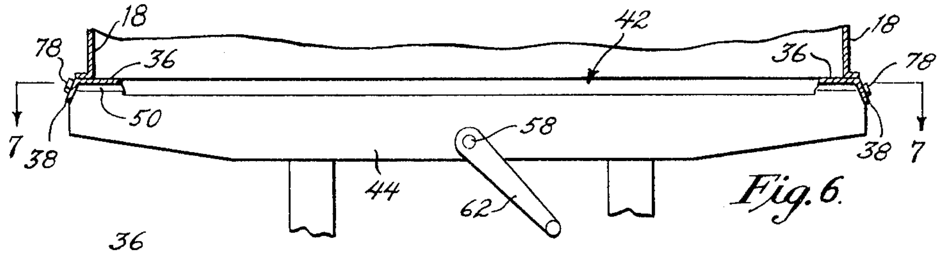
FIG. 6 is a sectional view taken on the line 6—6 of FIG. 1.

The body is further provided with two pairs of supports or landing gears 80 and 82, the former or fore landing gears being disposed towards the front of the body behind the king pin and the latter or aft landing gears being disposed towards the rear of the body in front of the bogie 42. As both pairs of landing gears are similar, a description of one will suffice. As will be seen from the drawings, each pair consists of two supports longitudinally offset from each other by the spacing between the cross-sills 20, generally about a foot apart. Each support includes an upper tubular member 84 which is pivoted around a horizontal axis 86 between adjacent cross-sills. Secured upon the member 84 is a collar 88 to which is pivoted as at 90 a pair of transversely extending brace rods 92. These rods are joined by a further collar 94 which journals a pin 96. Channels 97 are secured to the confronting faces of adjacent cross-sills having elongated slots 98 which slidably receive the ends of the pin 96, as seen in FIG. 4. The ends of the slots adjacent the pivot 86 of the member 84 are bent downwardly as at 99 so that the ends of the pin 96 can enter the same and releasably lock the brace rods 92 in their bracing position. Pivoted to the collar 88 as at 100 is a diagonal brace 102 which extends longitudinally of the body and is further pivoted as at 104 to a member 106 which extends between a further pair of cross-sills and is pivoted around a horizontal axis parallel to the pivot axis of the upper member 84. A lower member 106 is telescoped in the upper member and carries a ground-engageable foot 108. Thus the landing gears are movable from a vertical position to a substantially horizontal storage position between the cross-sills, there being a suitable means to removably retain the landing gears in the storage position, such as bars retractably mounted to straddle the landing gears.

Each pair of landing gears is adjustable in height. Thus there is secured to the upper end of each lower member a nut 110 which threadedly receives a screw 112, see FIG. 3, which extends through each upper member and secures a bevel gear 114 at its upper end that engages a further bevel gear 116 carried by a horizontal stub shaft 118. The stub shafts are operatively connected by gears 120 to a transverse shaft 122. A short transverse shaft 124 is provided which extends rotatably through the bottom rail and is provided with a handle 126, the shafts 124 and 122 being operatively connected by appropriate gears 128 whereby rotation of the handle in a clockwise or counter-clockwise direction will either raise or lower the lower members 106 of each pair of landing gears in unison to thereby vary the effective length thereof. To ensure that the hand grip 129 does not jut out of the side of the body when inoperative, the same is mounted to move inwardly and to be releasably retained in a suitable socket 130 in the bottom rail, see FIG. 5.

The overall system is carried out in the manner shown in FIGS. 11–17. The trailer body 10 is driven to the production site 132 where it rests on the bogie 42 and front landing gears 80 only, the latter having been adjusted by the crank handle 128 to elevate the front end or nose of the body approximately 48″ or more above the ground. A production worker loads the articles 134 directly from the conveyor 136 or other discharge mechanism of the machine into the trailer body which when fully laden can attain a load in the order of magnitude of 60,000 lbs. A tractor 138 equipped with a fifth wheel 140 which can be raised and lowered, generally hydraulically, is coupled to the king pin 34 and then raised about 3 to 4 inches at which point the operator may retract or shorten the front landing gears 80 if desired. The body is driven to an open storage site and the nose is further raised by the fifth wheel. The operator then disconnects the air hoses to the bogie which are equipped with conventional couplers having one-way check valves so that the bogie brakes are automatically set upon disconnect. He then retracts the coupling pins 70 by rotating the handle 62 until the ends 78 of the pins no longer engage in the track angle apertures 40 and raises the stepgaurd 32, there being a means (not shown) such as a chain to releasably retain the stepguard in the raised position.

Following this, the operator pivots the rear landing gears 82 to the vertical position and cranks the handle 126 until their feet 108 firmly engage the ground. He then lowers the nose by the fifth wheel causing the body to rock about the rear landing gears until he sights that there is a separation 142 between the rear of the body and the bogie, as seen through the side view mirror on the tractor. He then cranks the front landing gears 80 until their feet 108 engage the ground, uncouples the fifth wheel and drives the tractor 138 away. Thereafter the bogie is withdrawn by any suitable means which can raise the bogie as well as draw it away, as for example a conventional tractor 144, known as a Commando, which is equipped with bent arms 146 adapted to be raised and lowered hydraulically. These are made to extend between the bogie wheels 56 and engage the spacers normally provided between double wheels. If desired, the Commando unit 144 can also be used as the yard tractor 138. The final storage or warehouse position of the trailer body is that shown in FIG. 16 in which the body is supported on both pairs of landing gears.

It will be understood that the location and height of the rear landing gears 82 should be such that as large a moment arm of rocking as possible can be used to efficiently provide a separation 142 between the body and bogie sufficient to permit the bogie 42 to be raised and withdrawn from the rear of the body for re-use in the system. The location of the front landing gears 80 should be such as to provide, with the rear landing gears, proper support for the laden trailer body after the tractor 138 and the bogie 42 have been withdrawn. A non-limitative example of a smoothly operative mobile warehouse unit is a 40 foot trailer body in which the rearmost landing gear 82 is approximately 11 feet 10 inches from the rear of the body, the forwardmost landing gear approximately 8 feet 2½ inches from the nose, the bogie frame is approximately 7 feet 7 inches long and flush with the rear of the body when coupled thereto and the rear landing gears in the support position are approximately 3–5 inches longer than the front landing gears causing the rear to be elevated approximately 4 feet 2¾ inches above ground level as compared to 3 feet 10 inches for the nose.

Figure 1:
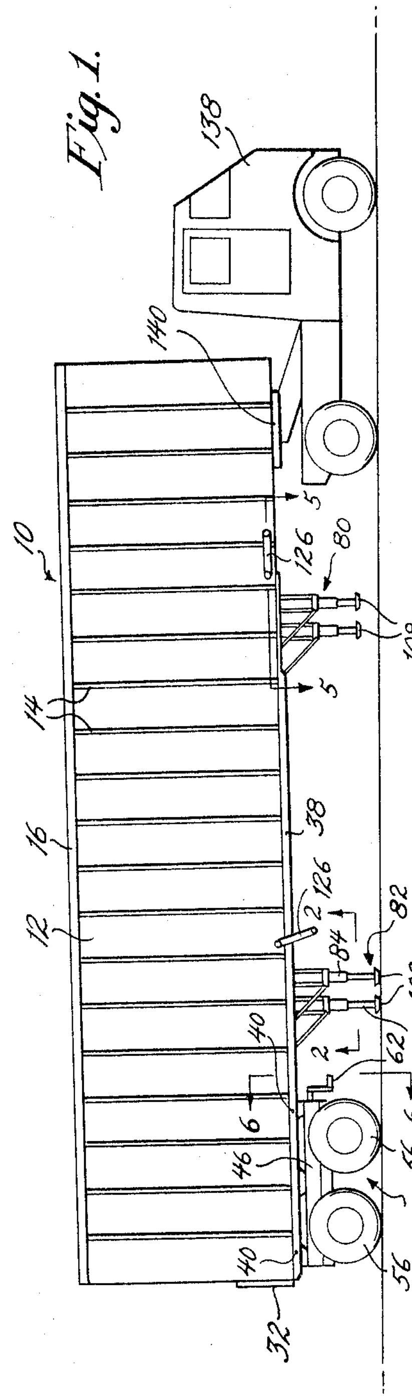
FIG. 1 is a side view of a trailer for use in the instant mobile warehouse system.
Figure 17:
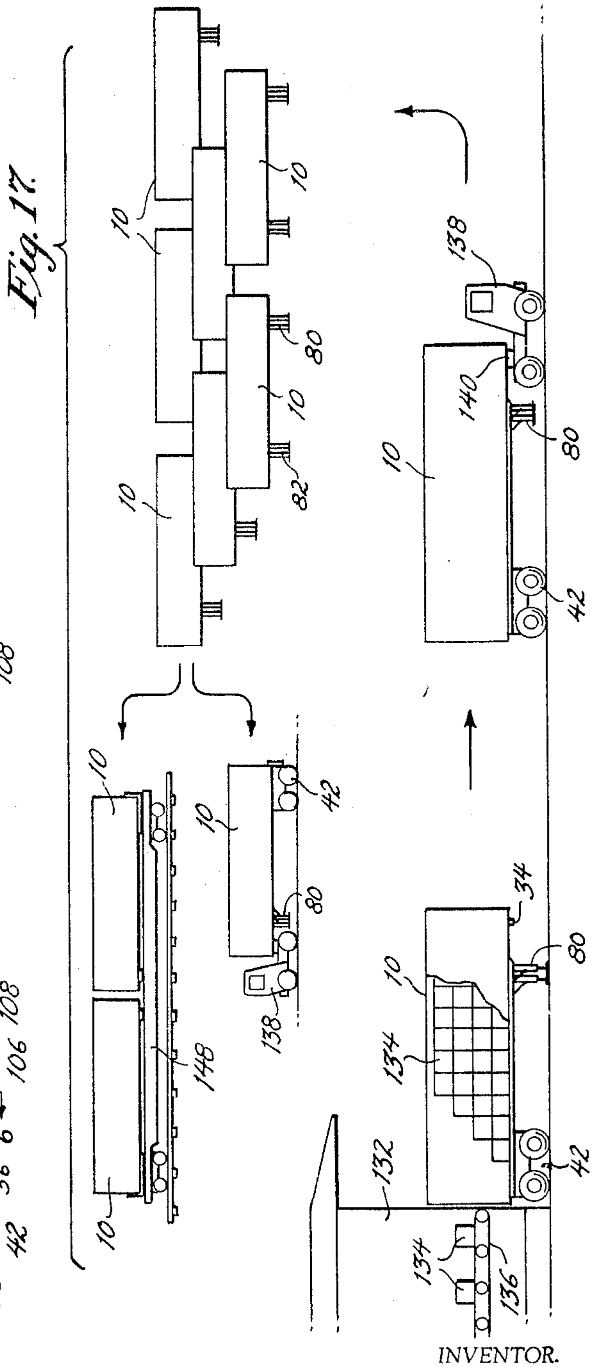
FIG. 17 is a diagrammatic view illustrating the overall system.

As will be seen in FIG. 17, a plurality of the trailer bodies adjacent each other in any desired open site constitutes a warehouse. When it becomes necessary to deliver the articles, the aforementioned procedure is reversed whereby the bogie 42 is moved into position beneath the rear of the body and there coupled, the tractor 138 is coupled to the front end of the body, the nose raised, the rear landing gears pivoted to and retained in the horizontal storage position between the cross-sills, the front landing gears retracted, the fifth wheel lowered and the trailer driven away to the point of destination for unloading or to a railroad siding where the body is uncoupled from the bogie and transferred onto a rail car 143 adapted to receive the same or to a pier where the body is uncoupled from the bogie and raised by a suitable crane and lowered into the hold of a ship or on deck.

Thus it will be seen that a flexible and versatile mobile warehouse system is provided which effects substantial savings in equipment, maintenance, labor and construction costs as well as the special warehousing fees and insurance required in conventional warehousing operations. While a preferred embodiment of the invention is here shown and described, it will be understood that a skilled artisan may make variations without departing from the spirit of the invention and the scope of the appended claims. Thus, for example, the single trailer body can be replaced by a pair of bodies coupled together horizontally as shown and described in the Bohlen et al. Patent No. 3,004,772.

I claim:

1. A method of transporting and storing materials comprised of providing an enclosed elongated trailer body having a wheeled unit detachably coupled to the rear thereof and fore and aft height-adjustable landing gears secured to said body, the aft landing gear being so secured as to be movable from an operative vertical to a retracted storage position, placing the materials in the body while it is supported upon the wheeled unit and the fore landing gear, detachably coupling a tractor to the front of the trailer body, raising the front of the body off the fore landing gear and driving the body to a storage site, uncoupling the wheeled unit, lowering the aft landing gear until it engages the ground, lowering the front end of the body while the tractor is still coupled thereto so that the body rocks around the aft landing gear until the rear of the body is spaced above the wheeled unit, lowering the fore landing gear until it engages the ground, uncoupling and withdrawing the tractor and finally withdrawing the wheeled unit so that the body remains supported in the storage position upon the fore and aft landing gears of unequal height.

2. The method of claim 1 wherein the degree of rocking around the aft leading gear is such that when the fore landing gear is lowered to ground engagement thereafter, there is sufficient clearance between the tractor and front of the body to permit unrestrained uncoupling and withdrawal of the tractor.

3. A method of transporting and storing materials comprised of providing an enclosed elongated trailer body having a wheeled unit detachably coupled to the rear thereof and fore and aft height-adjustable landing gears secured to said body, the aft landing gear being so secured as to be movable from an operative vertical to a retracted storage position, placing the materials in the body while it is supported upon the wheeled unit and the fore landing gear, detachably coupling a tractor to the front of the body equipped with a means to raise and lower the body at its point of coupling to the tractor, raising the front of the body off the fore landing gear and driving the body to a storage site, uncoupling the wheeled unit, lowering the aft landing gear until it engages the ground, lowering the front end of the body while the tractor is still coupled thereto so that the body rocks around the aft landing gear until the rear of the body is spaced above the wheeled unit, lowering the fore landing gear until it engages the ground, uncoupling and withdrawing the tractor and finally withdrawing the wheeled unit so that the body remains supported in the storage position upon the fore and aft landing gears of unequal height.

4. A method of transporting and storing articles comprised of providing an enclosed elongated trailer body having a wheeled unit detachably coupled to the rear thereof, and fore and aft height-adjustable landing gears so secured to the body as to be movable from an operative vertical to an inoperative storage horizontal position beneath the body, placing the materials in the body while it is supported upon the wheeled unit and the fore landing gear, detachably coupling a tractor to the front of the trailer body, raising the front of the body off the fore landing gear, and driving the body to a storage site, uncoupling the wheeled unit, lowering the aft landing gear until it engages the ground, lowering the front end of the body while the tractor is still coupled thereto so that the body rocks around the aft landing gear until the rear of the body is spaced above the wheeled unit, lowering the fore landing gear until it engages the ground, uncoupling and withdrawing the tractor and finally withdrawing the wheeled unit so that the body remains supported in the storage position upon the fore and aft landing gears of unequal height.

5. The method of claim 4 wherein said tractor is equipped with a means to raise and lower the body at its point of coupling to the tractor.

6. A method of transporting and storing materials comprised of providing an enclosed elongated trailer body having a wheeled unit detachably coupled to the rear thereof, a king pin secured adjacent the front of the body, a pair of aft landing gears adjustable in height and pivotally secured to the body forward of and adjacent to the wheeled unit, a pair of fore landing gears adjustable in height and secured to the body to the rear of adjacent the hand gear, placing the materials in the body while it is supported upon the wheeled unit and the fore landing gears, providing a tractor with a fifth wheel and means to raise and lower the same, coupling the fifth wheel to the king pin, raising the fifth wheel and thereby the front of the body off the fore landing gears, uncoupling the wheeled unit, lowering the aft landing gears to ground engagement, lowering the fifth wheel and front of the body so that the latter rocks about the aft landing gears until the rear of the body is spaced from the wheeled unit, lowering the fore landing gears to ground engagement while the tractor is still coupled to the body and finally withdrawing the wheeled unit from beneath the rear of the body so that the latter remains supported in the storage position upon to fore and aft landing gears of unequal height.

7. The method of claim 6 wherein the wheeled unit is withdrawn by a tractive member equipped with means to raise the wheeled unit off the ground.

8. The method of claim 6 wherein the fore landing gears are also pivotally secured to the body so that when both fore and aft landing gears are pivoted to horizontal storage positions beneath the body and the wheeled unit is removed, the body is adapted for transfer as a container to a rail car or ship.

9. The method of claim 6 wherein the body is rocked about the aft landing gears to a point where when the fore landing gears are then lowered to ground engagement and the fifth wheel is also lowered a clearance between the fifth wheel and the body results whereby the fifth wheel can be uncoupled and the tractor unrestrainedly withdrawn.

References Cited by the Examiner

UNITED STATES PATENTS 2,466,938 4/1949 Evans et al. ------ 214—38.8 X

FOREIGN PATENTS 211,871 12/1955 Australia.

GERALD M. FORLENZA, *Primary Examiner.*

A. J. MAKAY, *Assistant Examiner.*